United States Patent
Liu et al.

(10) Patent No.: US 8,695,586 B2
(45) Date of Patent: Apr. 15, 2014

(54) SOLAR COLLECTOR AND SOLAR HEATING SYSTEM USING SAME

(75) Inventors: Peng Liu, Beijing (CN); Pi-Jin Chen, Beijing (CN); Liang Liu, Beijing (CN); Kai-Li Jiang, Beijing (CN); Ding Wang, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 12/381,551

(22) Filed: Mar. 12, 2009

(65) Prior Publication Data

US 2010/0065042 A1    Mar. 18, 2010

(30) Foreign Application Priority Data

Apr. 11, 2008 (CN) .......................... 2008 1 0006571

(51) Int. Cl.
F24J 2/24 (2006.01)
(52) U.S. Cl.
USPC ........... 126/569; 126/655; 126/704; 126/707; 126/708
(58) Field of Classification Search
USPC ................. 126/569, 655, 704, 705, 707, 708
See application file for complete search history.

(56) References Cited

U.S. PATENT DOCUMENTS

| | | | | |
|---|---|---|---|---|
| 3,974,822 A * | 8/1976 | Patil | | 126/708 |
| 4,097,308 A * | 6/1978 | Klein et al. | | 136/251 |
| 4,119,083 A * | 10/1978 | Heyen et al. | | 126/674 |
| 4,159,706 A | 7/1979 | Mahdjuri | | |
| 4,184,480 A * | 1/1980 | Kenny | | 126/704 |
| 4,721,349 A * | 1/1988 | Fan et al. | | 359/360 |
| 4,822,120 A | 4/1989 | Fan et al. | | |
| 4,949,704 A * | 8/1990 | Pfluger | | 126/594 |
| 5,653,222 A * | 8/1997 | Newman | | 126/653 |
| 5,915,376 A * | 6/1999 | McLean | | 126/653 |
| 7,182,475 B2 * | 2/2007 | Kramer et al. | | 359/507 |
| 7,183,003 B2 | 2/2007 | Leu et al. | | |

(Continued)

FOREIGN PATENT DOCUMENTS

CN    2302262    12/1998
CN    2457521 Y  10/2001

(Continued)

OTHER PUBLICATIONS

Liang Jintao, Liu Junhua, Optimization of a IR detector of Microcantilever with Carbon Nanometer Tube, ACTA OPTIC SINICA, Nov. 2004, pp. 1547-1551, vol. 24 No. 11.

(Continued)

*Primary Examiner* — Avinash Savani
(74) *Attorney, Agent, or Firm* — Altis Law Group, Inc.

(57) ABSTRACT

A solar collector includes a substrate having a top surface and a bottom surface opposite to the upper surface, a sidewall, a transparent cover, and a heat-absorbing layer. The sidewall is arranged on the top surface of the substrate. The transparent cover is disposed on the sidewall opposite to the substrate to form a sealed chamber with the substrate together. The heat-absorbing layer is disposed on the upper surface of the substrate and includes a carbon nanotube film having a plurality of carbon nanotubes. The carbon nanotubes in the carbon nanotube film are entangled with each other.

19 Claims, 4 Drawing Sheets

(56) References Cited

U.S. PATENT DOCUMENTS

| | | |
|---|---|---|
| 7,608,293 B2 | 10/2009 | Huang et al. |
| 7,794,572 B2 * | 9/2010 | Lee .................... 202/234 |
| 2005/0002849 A1 | 1/2005 | Mitsui et al. |
| 2005/0095938 A1 | 5/2005 | Rosenberger et al. |
| 2006/0048808 A1 | 3/2006 | Ruckman et al. |
| 2007/0062799 A1 * | 3/2007 | Lee .................... 202/234 |
| 2008/0049380 A1 | 2/2008 | Miyahara et al. |
| 2008/0178920 A1 | 7/2008 | Ullo |
| 2008/0248235 A1 | 10/2008 | Feng et al. |
| 2010/0236543 A1 | 9/2010 | Oetting et al. |

FOREIGN PATENT DOCUMENTS

| | | |
|---|---|---|
| CN | 2486079 | 4/2002 |
| CN | 1474113 | 2/2004 |
| CN | 2641536 Y | 9/2004 |
| CN | 201014777 Y | 1/2008 |
| CN | 101239712 | 8/2008 |
| DE | 19704323 | 7/1998 |
| DE | 102006039804 | 2/2008 |
| EP | 1529857 | 5/2005 |
| JP | 52-116942 | 9/1977 |
| JP | 58-52932 | 3/1983 |
| JP | S58-52932 | 3/1983 |
| JP | 62-59342 | 3/1987 |
| JP | 2001-226108 | 8/2001 |
| JP | 2003-160322 | 6/2003 |
| JP | 2004-211718 | 7/2004 |
| JP | 2005199666 | 7/2005 |
| JP | 2006-1820 | 1/2006 |
| JP | 2006114826 | 4/2006 |
| JP | 2006-229168 | 8/2006 |
| JP | 2006-265079 | 10/2006 |
| JP | 2007-183252 | 7/2007 |
| JP | 2008-44820 | 2/2008 |
| JP | 2009-141079 | 6/2009 |
| TW | I253467 | 4/2006 |
| TW | 200639119 | 11/2006 |
| TW | I282326 | 6/2007 |
| WO | WO2007015670 | 2/2007 |

OTHER PUBLICATIONS

Zhu et al., Carbon Nanometer Tube, China Machine Press, Jan. 2003, pp. 195-198.

Xiao-gang Sun, "Investigation on Radar Absorbing Properties of Carbon Nanotube", Journal of Synthetic Crystals, Feb. 2005, vol. 34, No. 1, p. 174-177 (Wherein, abstract maybe relevant).

* cited by examiner

SOLAR COLLECTOR AND SOLAR HEATING SYSTEM USING SAME

This application is related to applications entitled, "SOLAR COLLECTOR AND SOLAR HEATING SYSTEM USING SAME", filed Mar. 12, 2009 (Ser. No. 12/381,577); "SOLAR COLLECTOR AND SOLAR HEATING SYSTEM USING SAME", filed Mar. 12, 2009 (Ser. No. 12/381,611); "SOLAR COLLECTOR AND SOLAR HEATING SYSTEM USING SAME", filed Mar. 12, 2009 (Ser. No. 12/381,578); AND "SOLAR COLLECTOR AND SOLAR HEATING SYSTEM USING SAME", filed Mar. 12, 2009 (Ser. No. 12/381,579). The disclosures of the above-identified applications are incorporated herein by reference.

BACKGROUND

1. Technical Field

The present disclosure relates to a solar collector and, particularly, to a solar collectors incorporating carbon nanotubes.

2. Description of Related Art

Generally, solar collectors can be divided into two typical types: pipe solar collectors and flat plate solar collectors. For many applications, it has been demonstrated that the most efficient and least expensive type of solar collector is the flat plate collector. Referring to FIG. 4, a typical flat plate collector 500, according to the prior art, includes a substrate 52, a sidewall 56 arranged on the periphery of the substrate 52, and a transparent cover 50 fixed on the sidewall 56 opposite to the substrate 52. A sealed chamber 60 is formed between the substrate 52 and the transparent cover 50. A number of supporters 58 are dispersed in the sealed chamber 60 at random. The transparent cover 50 is used for passage of light and is made of glass, plastic and other transparent materials. The substrate 52 is made of absorbing materials, such as copper, aluminum, or the likes. In use, the light enters the collector 500 through the transparent cover 50, and is absorbed by the substrate 52. Thus, heat is generated by the substrate 52 and is transferred to a storage apparatus (not shown).

Actually, the traditional thin films made of absorbing materials have very high absorbing efficiency. The traditional solar collector 500 can't adopt the thin film technology because the film is difficult to evaporate on the large area substrate. As such, the heat absorbing efficiency of the solar collector 500 is limited by the material it used. Therefore, the efficiency of the collector 500 is limited accordingly.

What is needed, therefore, is to provide a solar collector and a solar heating system using the solar collector that can overcome the above-described shortcomings.

BRIEF DESCRIPTION OF THE DRAWINGS

Many aspects of the present solar collector and solar heating system can be better understood with references to the following drawings. The components in the drawings are not necessarily drawn to scale, the emphasis instead being placed upon clearly illustrating the principles of the present solar collector.

Figure 1:
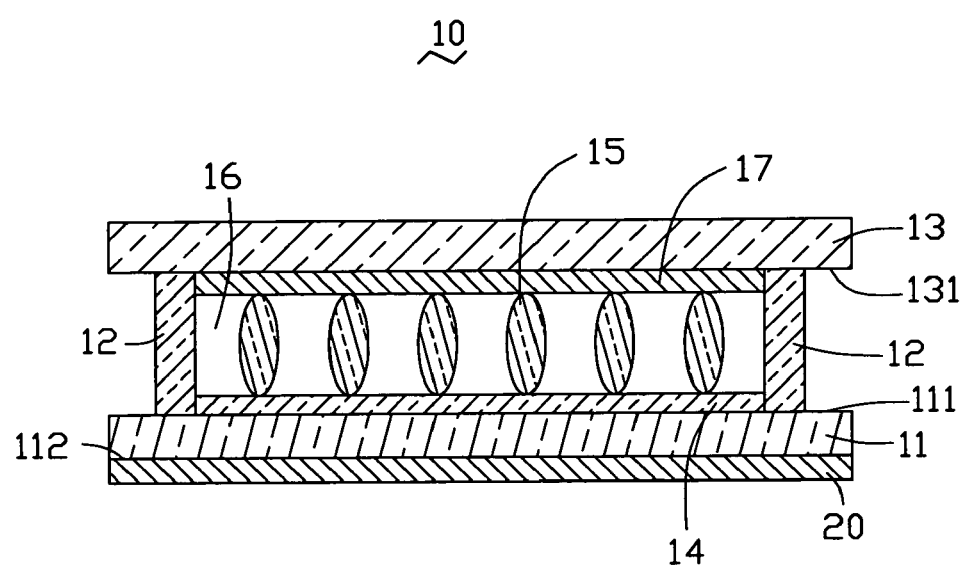
FIG. 1 is a schematic, side view of a solar heating system having a carbon nanotube film in accordance with the present embodiment.

Corresponding reference characters indicate corresponding parts throughout the several views. The exemplifications set out herein illustrate at least one embodiment of the solar collector, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the solar collector.

Figure 2:
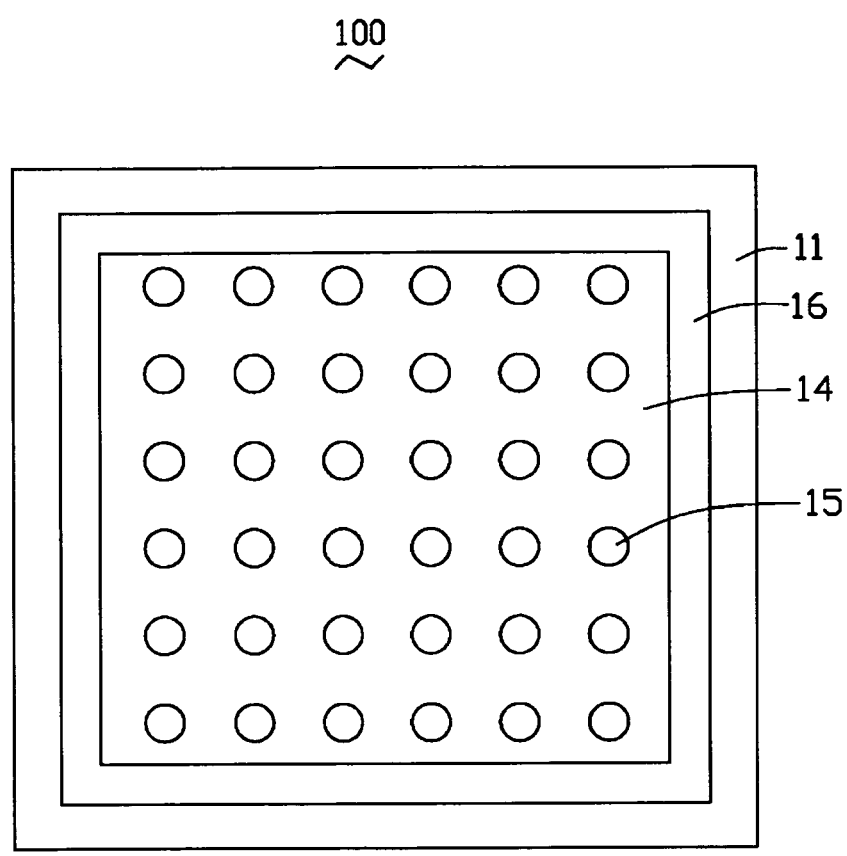
FIG. 2 is a schematic, top view of a solar collector used in the solar heating system of FIG. 1.

Referring to FIG. 1-2, a solar heating system 100 according to the present embodiment is shown. The solar heating system 100 includes a solar collector 10 and a storage apparatus 20 connected to the solar collector 10. The storage apparatus 20 is configured for storing heat generated by the solar collector 10.

The solar collector 10 includes a substrate 11, a sidewall 12, a transparent cover 13, a heat-absorbing layer 14 and a number of supporters 15. The substrate 11 has a top surface 111 and a bottom surface 112 opposite to the top surface 111. The transparent cover 13 has a bottom surface 131. The sidewall 12 is mounted on the periphery of the top surface 111 of the substrate 11. The transparent cover 13 is attached on the sidewall 12 opposite to the substrate 11 to form a sealed chamber 16 in cooperation with the sidewall 12 and the substrate 11. The heat-absorbing layer 14 is disposed on the top surface 111 of the substrate 11 and received in the sealed chamber 16.

The material of the substrate 11 is selected from one of heat-conducting materials, such as metal, glass, polymer, and so on. A thickness of the substrate 11 can be in a range from about 100 μm to about 5 mm. The shape of the substrate 11 is not limited; and may be triangular, hexagonal, and so on.

The transparent cover 13 may be a solar radiation access window. The material of the transparent cover 13 includes a material that can be selected from a group *consisting of glass, plastic, transparent porcelain, polymer and other transparent materials. A thickness of the transparent cover 13 can be in a range from about 100 μm to about 5 mm. The shape of the transparent cover 13 is not limited, and may be triangle, hexagon, quadrangle, and so on.

The sidewall 12 is configured for supporting the transparent cover 13, and then formed the sealed chamber 16 between the transparent cover 13 and the substrate 11. The sidewall 12 can be made of materials selected from glass, plastics, polymers, and the like. A height of the sidewall 12 is not limited. A thickness of the sidewall 12 can be in a range from about 100 μm to about 500 μm. In the present embodiment, the range is about 150 μm to about 250 μm.

The sealed chamber 16 may be a vacuum chamber or an atmospheric chamber filled with thermal-insulating materials. In the present embodiment, the sealed chamber 16 is an atmospheric chamber, and the thermal-insulating materials filled therein can be transparent foam materials, such as transparent foam rubber, transparent foam plastics, or the like. The sealed chamber 16 can also be filled with thermal-insulating gas such as nitrogen and inert gases.

Figure 3:
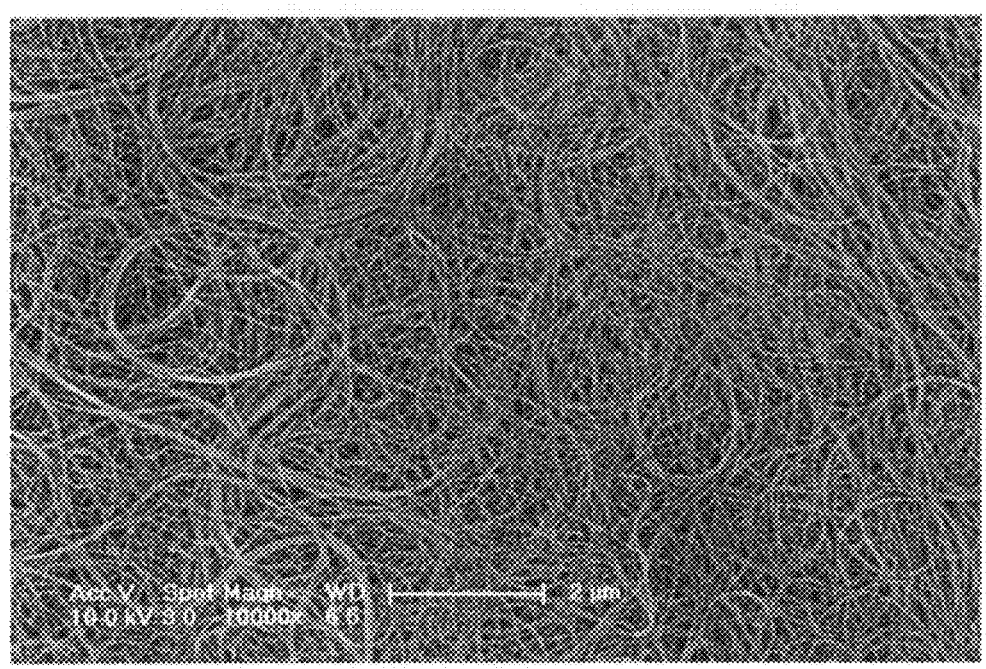
FIG. 3 is a Scanning Electron Microscope (SEM) image of a carbon nanotube film.
Figure 4:
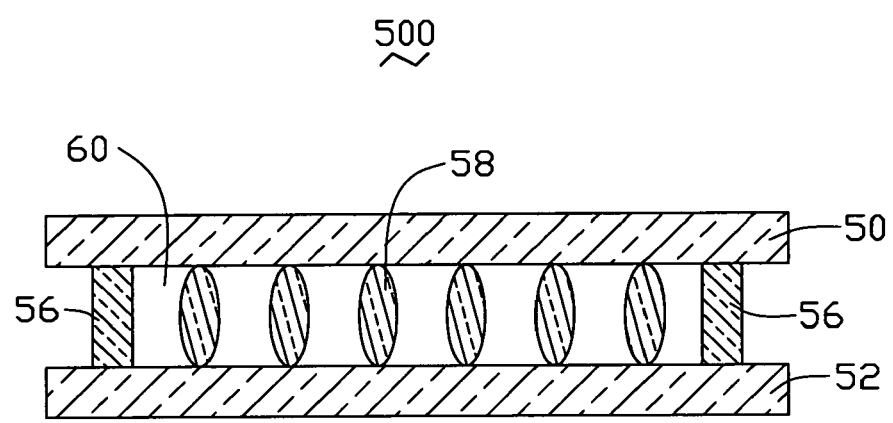
FIG. 4 is a schematic view of a typical solar collector according to the prior art.

The heat-absorbing layer 14 includes a carbon nanotube film. The carbon nanotube film can be a structure formed by a flocculation process. The carbon nanotube film includes a plurality of carbon nanotubes dispersed uniformly therein. Referring to FIG. 3, the carbon nanotube film can be a free-standing carbon nanotube film. The carbon nanotube film is a carbon nanotube film with a plurality carbon nanotubes therein that are isotropic, uniformly arranged, disordered, and are entangled together. The adjacent carbon nanotubes in the carbon nanotube film are combined and attracted by van der Waals attractive force, thereby forming a free-standing structure. There is a plurality of micropores distributed in the carbon nanotube film, as such a specific area of the carbon nanotube film is extremely large. The thickness of the pressing carbon nanotube film is ranged from about 1 µm to about 1 mm.

The carbon nanotubes of the carbon nanotube film can be selected from a group comprising of single-walled carbon nanotubes, double-walled carbon nanotubes, multi-walled carbon nanotubes, and combinations thereof A diameter of the carbon nanotubes approximately is ranged from about 0.5 to about 50 nm. A length of the carbon nanotubes is longer than 10 µm. In the present embodiment, the length is ranged from about 100 µm to about 1 mm.

The supporters 15 are configured for increasing the strength of the solar collector 10. The supporters 15 are dispersed in the sealed chamber 16 at random or in a desired pattern. The supporters 15 are spaced from each other and disposed between the substrate 11 and the transparent cover 13. The supporters 15 are made of thermal-insulating materials, such as glass, plastics, rubber, and so on. A height of the supporters 15 is the same as that of the sidewall 12 for contacting with the transparent cover 13. The shape of the supporters 15 is not limited, and may be, for example, rounded or bar-shaped.

The solar collector 10 further includes a reflection layer 17. The reflection layer 17 is disposed on the bottom surface 131 of the transparent cover 13. The reflection layer 17 is configured for allowing the visible light and near infrared light of the sunlight passing through the transparent cover 13 and reflecting the far infrared light radiated from the heat-absorbing layer 14 to prevent thermal radiation from escaping the sealed chamber 16. Thus, the light absorbing efficiency of the solar collector 10 is improved. The reflection layer 17 may be an indium tin oxide (ITO) film or a titanium dioxide film and a thickness of the reflection layer 17 can ranges from about 10 nm to about 1 µm.

The storage apparatus 20 is located on a bottom surface 112 of the substrate 11 and may include a number of pipes (not shown) filled with circulating liquid. The liquid may be selected from the group of water, glycol, or the like.

In use, since the carbon nanotube film is black and has a capability of absorbing most heat of the solar spectrum. The sunlight travels through the transparent cover 13 and reaches the heat-absorbing layer 14. A good portion of the radiation of the sunlight is absorbed by the heat-absorbing layer 14. Then, the heat absorbed by the heat-absorbing layer 14 is conducted to the storage apparatus 20 via the substrate 11. Therefore, the solar collector 10 has a high efficiency because of the excellent light absorbing properties of the carbon nanotubes of the heat-absorbing layer 14. The solar collector 10 is durable due to the toughness of the carbon nanotubes in the carbon nanotube film. Since carbon nanotubes do not oxidized easily, a high vacuum surrounding is not necessary for making the solar collector 10. Thus the cost of the solar collector 10 is relatively low when compared to the prior art.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A solar collector comprising:
    a substrate;
    a sidewall;
    a transparent cover disposed on the sidewall, wherein the substrate, the sidewall and the transparent cover are connected with each other to form a sealed chamber, wherein the sealed chamber is an atmospheric chamber filled with thermal-insulating materials and has a pressure equal to an atmospheric pressure; and
    a heat-absorbing layer disposed on the substrate, the heat-absorbing layer comprising a carbon nanotube film comprising a plurality of carbon nanotubes entangled with each other, wherein the heat-absorbing layer is configured to conduct heat to a storage apparatus via the substrate.

2. The solar collector as claimed in claim 1, wherein a length of each carbon nanotube is in a range from about 100 µm to about 1 mm.

3. The solar collector as claimed in claim 1, wherein a thickness of the carbon nanotube film is in a range from about 1 µm to about 1 mm.

4. The solar collector as claimed in claim 1, further comprises a reflection layer disposed on a surface of the transparent cover.

5. The solar collector as claimed in claim 4, wherein a thickness of the reflection layer is in a range from 10 nm to about 1 µm.

6. The solar collector as claimed in claim 4, wherein the reflection layer is an indium tin oxide film or a titanium dioxide film.

7. The solar collector as claimed in claim 1, wherein a material of the transparent cover is selected from the group consisting of glass, plastic, transparent porcelain, and polymer.

8. The solar collector as claimed in claim 1, wherein a thickness of the transparent cover is in a range from 100 µm to about 5 mm.

9. The solar collector as claimed in claim 1, wherein a material of the substrate is selected from the group consisting of metal, glass, and polymer.

10. The solar collector as claimed in claim 9, wherein a thickness of the substrate is in a range from 100 µm to about 5 mm.

11. The solar collector as claimed in claim 1, wherein the sidewall is made of glass, and a height of the sidewall is in a range from 100 µm to about 500 µm.

12. The solar collector as claimed in claim 1, wherein the atmospheric chamber is filled with nitrogen or inert gases.

13. The solar collector as claimed in claim 1, further comprising a plurality of supporters spaced from each other and disposed between the substrate and the transparent cover.

14. A solar heating system comprising:
    a solar collector comprising:
        a substrate having a top surface;
        a sidewall;
        a transparent cover having a bottom surface and disposed on the sidewall, wherein the substrate, the sidewall and the transparent cover are connected with each other to form a sealed chamber;
        a heat-absorbing layer disposed on the top surface of the substrate, the heat-absorbing layer comprising a carbon nanotube film comprising a plurality of carbon nanotubes entangled with each other;

a reflection layer located on the bottom surface of the transparent cover and facing the heat-absorbing layer; and a heat storage apparatus connected to the substrate and configured for storing heat generated by the heat-absorbing layer;

wherein the heat-absorbing layer is configured to conduct heat to the storage apparatus via the substrate.

15. The solar heating system as claimed in claim 14, wherein the sealed chamber is an atmospheric chamber.

16. The solar heating system as claimed in claim 14, wherein the carbon nanotube film is a free-standing structure.

17. The solar heating system as claimed in claim 14, wherein the sealed chamber is an atmospheric chamber filled with thermal-insulating materials.

18. The solar collector as claimed in claim 1, wherein the carbon nanotube film defines a plurality of micropores therein.

19. The solar collector as claimed in claim 1, wherein the thermal-insulating materials are transparent foam rubber or transparent foam plastic.

\* \* \* \* \*